United States Patent
Day et al.

(10) Patent No.: US 6,355,277 B1
(45) Date of Patent: Mar. 12, 2002

(54) USE OF ORGANOCOPPER COMPLEXES WITH AMINE MOLYBDATES AS SMOKE SUPPRESSANTS IN HALOGEN CONTAINING POLYMERIC COMPOSITIONS

(75) Inventors: James F. Day, Winston-Salem; Chad E. Lee, Kernersville, both of NC (US)

(73) Assignee: Unitex Chemical Corporation, Greensboro, NC (US)

( * ) Notice: Subject to any disclaimer, the term of this patent is extended or adjusted under 35 U.S.C. 154(b) by 0 days.

(21) Appl. No.: 09/617,488

(22) Filed: Jul. 14, 2000

(51) Int. Cl.⁷ .................. A01N 55/02; A01N 59/20; C09K 21/00; C08K 5/34; C08K 5/16
(52) U.S. Cl. .................. 424/632; 424/601; 424/604; 424/606; 424/646; 514/492; 514/185; 252/609; 524/87; 524/96; 524/100; 524/204
(58) Field of Search .................. 424/604, 632, 424/646, 601, 606; 252/609; 514/492, 185; 524/87, 96, 100, 204

(56) References Cited

U.S. PATENT DOCUMENTS

| | | | |
|---|---|---|---|
| 4,053,455 A | * 10/1977 | Kroenke | 524/97 |
| 4,153,792 A | 5/1979 | Kroenke | 544/181 |
| 4,217,292 A | 8/1980 | Kroenke | 260/429 |
| 6,217,797 B1 | * 4/2001 | Day et al. | 252/609 |

OTHER PUBLICATIONS

R.D. Pike et al., Metal–Promoted Reductive Cross–Linking for Smoke Suppression in Poly(vinyl chloride), 8$^{th}$ Annual BCC Conference on Flame Retardancy, pp. 44–56 (1997).

* cited by examiner

*Primary Examiner*—John Pak
(74) *Attorney, Agent, or Firm*—Roylance, Abrams, Berdo & Goodman, L.L.P.

(57) ABSTRACT

There is disclosed a method of improving the smoke suppressant characteristics of halogen-containing polymeric compositions which comprises adding to said polymeric compositions a smoke retardant amount of (1) a complex of a cuprous halide and a phosphite, and (2) an amine molybdate which contains no residual molybdenum trioxide prepared by reacting an amine with molybdenum trioxide in an aqueous acidic medium under greater than atmospheric pressure and at a temperature of from 105–150° C.

10 Claims, No Drawings

USE OF ORGANOCOPPER COMPLEXES WITH AMINE MOLYBDATES AS SMOKE SUPPRESSANTS IN HALOGEN CONTAINING POLYMERIC COMPOSITIONS

BACKGROUND OF THE INVENTION

Vinyl chloride and vinylidene chloride polymers are known to be self-extinguishing and relatively more flame retardant than other polymers such as polyethylene, polypropylene and the like. However, a substantial amount of smoke may be produced upon exposure of vinyl chloride and vinylidene chloride polymers to a flame. The fact that an additive is a flame retardant does not necessarily mean that it will have good smoke retardant properties.

Inorganic and organometallic complexes of molybdenum are commercially useful as smoke suppressants in halogenated resins. Various amine molybdates have been investigated by B.F. Goodrich, see U.S. Pat. No. 4,153,792, for smoke suppression in PVC compounds. These compounds were plagued with poor performance properties due to residual molybdenum trioxide. The residual $MoO_3$ causes blue discoloration of the resin systems coupled with poor thermal stability.

The most commercially recognized material for smoke suppression in PVC is ammonium octamolybdate (AOM). AOM is the premium material to make low smoke PVC compounds, particularly for plenum wire and cable applications. AOM is used in numerous PVC jacket formulations that pass the rigorous UL910 test for cables (cooper conductor and fiber optic cables).

U.S. Pat. No. 4,153,792 discloses the production of amine molybdates, especially melamine molybdate by reacting an amine, such as melamine, with molybdenum trioxide in an aqueous acidic medium under reflux.

U.S. Pat. No. 4,217,292 discloses the production of amine molybdates, preferably melamine molybdate by reacting an amine such as melamine with a stoichiometric quantity of molybdenum trioxide in an aqueous medium in the presence of an ammonium salt. The aqueous medium is essentially free of acid. The reaction may be conducted at temperatures within the range of 75–110° C.

Organic salts of divalent copper are also well known as smoke suppressants for polyvinyl chloride resins. Most studies were done using copper (II) acetate or copper (II) formate. These materials were designed to undergo decomposition to ground state copper (Cu°). This is referred to as a reductive coupling mechanism. Reductive coupling results in significant reduction of smoke upon ignition due to char formation. Copper in its ground state is active in reductive coupling of halogenated resins. The difficulty with copper (II) salts are two fold.

1. The salts are blue or blue-green in color which also color the resin systems.
2. The salts upon decomposition cause instability of the halogenated resin by dechlorination without reductive coupling. This dechlorination accelerates decomposition to olefinic species.

The use of melamine molybdate and copper compounds such as copper acetate, copper oxalate, and copper formate as smoke suppressants in halogenated resins, particularly PVC is well known. This technology was never commercialized due to the technical failures of these systems. The pitfalls include:

Blue to green discoloration of the resin systems,
Poor thermal stability of the compounded resin systems, and
Loss of fire resistance characteristics due to the thermal instability of the compounded resin systems.

SUMMARY OF THE INVENTION

According to this invention, there is provided a method of improving the smoke suppressant characteristics of halogen-containing polymeric compositions which comprises adding to said polymeric compositions a smoke retardant amount of (1) a complex of a cuprous halide and a phosphite, and (2) an amine molybdate which contains no residual molybdenum trioxide prepared by reacting an amine, preferably melamine, with molybdenum trioxide in an aqueous acidic medium under greater than atmospheric pressure and at a temperature of from 105–150° C. The reaction between the molybdenum trioxide and amine is conducted for a time sufficient to eliminate all detectable amounts of molybdenum trioxide. As win be seen hereinafter, several of the combinations of a complex of a cuprous halide and a phosphite, and an amine molybdate provide a synergistic action, ie., the smoke suppressant results are greater than the additive effect of the two materials being used separately.

DETAILED DESCRIPTION OF THE INVENTION

Preparation of the Copper Complex

The copper complex is prepared by mixing 1 mole of phosphite with 0.01 mole to 1.0 mole of cuprous halide, preferably cuprous bromide or cuprous chloride, and most preferably cuprous chloride. The materials are mixed at 80° C. in an inert atmosphere (e.g., nitrogen) until the cuprous halide is dissolved. If the phosphite is a liquid, no additional solvent is required. However, if the phosphite is not a liquid, the reaction may be conducted in any non-reactive solvent, such as benzene, toluene or xylene. The dissolution time is typically 5 to 8 hours. The reaction mass is filtered with filter aid (e.g., diatomaceous earth, celatom FW-12, celite, etc.) under an inert atmosphere to yield a clear and colorless liquid. An exception is the reaction product of triphenylphosphite with cuprous chloride which yields a white crystalline solid melting at 65° C.

The phosphite may be any commercially available phosphite such as tris-dodecyl phosphite, tris-tridecyl phosphite, tris-$C_{12-15}$ alkyl phosphite, tetraphenyl dipropylene glycol diphosphite, poly(dipropylene glycol)phenyl phosphite, alkyl($C_{12-15}$)bisphenol A phosphite, alkyl($C_{10}$)bisphenol A phosphite, distearyl pentaerythritol diphosphite, tris-nonylphenyl phosphite, triisooctyl phosphite, diisodecyl pentaerythritol diphosphite, heptakis(dipropylene glycol) triphosphite, poly-4,4'-isopropylidenediphenol $C_{12-15}$ alcohol phosphite, tris-dipropyleneglycol phosphite, poly(dipropylene glycol)phenyl phosphite, diphenyl isooctyl phosphite, tris(2,4-t-butylphenyl)phosphite, bis(2,4-dicumylphenyl) pentaerythritol diphosphite, tris butoxyethyl phosphite, triphenyl phosphite, diphenyl isodecyl phosphite, phenyl diisodecyl phosphite and diphenyl phosphite.

The following example illustrates the preparation of a complex of copper and a phosphite:

EXAMPLE A

One mole of tris-tridecyl phosphite is reacted with one mole of CuCl at 80° C. in an inert nitrogen atmosphere until the CuCl is dissolved. The dissolution requires 5 to 8 hours. The reaction mass is filtered hot with a filter aid, diatomaceous earth, under an inert nitrogen atmosphere to yield a clear and colorless liquid.

Other copper complexes are prepared by substituting one of the phosphites set forth above for the tris-tridecyl phosphite used in Example A.

Preparation of the Amine Molybdates

Amine molybdates are produced in accordance with this invention by reacting essentially stoichiometric quantities of molybdenum trioxide with an amine in an aqueous acidic medium, preferably containing a water soluble ammonium salt of a monovalent or divalent acid. The reaction is conducted at a temperature of 105–150° C., and, preferably, at a temperature of 115–150° C. under a pressure of up to 6 bar. Preferably, the pH of the reaction mixture is within the range of 5–7.

Amines suitable for preparing the amine molybdates using the process of this invention include polymeric amines, as well as simple amines. The simple amines may contain from 1 to 75 carbon atoms and from 1 to 10 primary, secondary, or tertiary amine groups or a mixture thereof, more preferably from 1 to 6 groups. Simple amines include aliphatic, alicyclic, aromatic and heterocyclic amines. Examples of suitable polymeric amines include polyethyleneimine, polyvinylpyridine, polyvinylpyrroilidine and poly(2,24-trimethyl-1,2-dihydroquinolyl). Examples of suitably simple amines include aliphatic amines such as ethylamine, ethylenediamine, 1,2-propanediamine, 1,3-propanediamine, 1,4-butanediamine, 2-methyl-1,2-propanediamine, 1,5-pentanediamine, 1,6-hexanediamine, 1,7-heptanediamine, 1,8-octanediamine, 1,10-decanediamine, 1,12-dodecanediamine, and the like. Also suitable are aliphatic amines such as diethylenetriamine, triethylenetetramine, tetraethylenepentamine, bis(hexamethylene)triamine, 3,3'-iminobispropylamine, guanidine carbonate, and the like. Other suitable amines include alicyclic diamines and polyamines such as 1,2-diaminocyclohexane, 1,8-p-menthanediamine, and the like, aromatic amines such as aniline, N,N-diethylamine, and the like, and heterocyclic amines such as melamine and substituted melamines, ammeline, pyridene, piperazine, hexamethylenetetramine, 2,2,4-trimethyldecahydroquinoline, and N-(aminoalkyl)-piperazines wherein each alkyl group contains from 1 to 12 carbon atoms, more preferably 1 to 6 carbon atoms, such as N-(2-aminoethyl)-piperazine and the like.

The following example illustrates the preparation of melamine octamolybdate.

EXAMPLE B

Melamine octamolybdate is prepared by charging a 50 gallon reactor with 292 pounds of deionized water. The agitator is started and 9.37 pounds of glacial acetic acid are added followed by 9.69 pounds of aqueous ammonium hydroxide. The pH measured as is should be 5–7. A slightly acidic pH is required. There are then added 9.69 pounds of melamine and 22.14 pounds of molybdenum trioxide. The reactor is sealed and heated to 135° C. under pressure for three hours. The product slurry is initially blue and eventual turns white after all the molybdenum trioxide has been eliminated. The reactor is cooled to 20–30° C. and the reaction mass is filtered. The filter cake is washed with deionized water to neutrality. The product is dried under vacuum at 135° C. until less than 0.05% water by weight is achieved as measured by Karl Fischer titration. The dried product is micronized with an air jet mill to an average particle size of 2 microns. The finished product is snow white in color with no free molybdenum trioxide as determined by x-ray diffraction analysis.

In contrast, when Example B is repeated using reflux instead of heating at 135° C. for 1 to 48 hours, there is obtained a product with a slight blue cast with residual molybdenum trioxide ranging from 0.68 to 2.3% by weight.

Use of Complex of Copper and Phosphite Prepared as Described in Example A and Amine Molybdate Prepared as Described in Example B As Smoke Suppressants in a Halogen-Containing Polymeric Composition The copper complex and amine molybdate are compounded with halogenated resins such as PVC, PVDF, PTFE, PVDC, CPVC, and ECTFE resins with various other standard additives, such as fillers, colorants, plasticizers, stabilizers, as well as other smoke suppressants. The halogenated resins containing the copper complex and amine molybdate are particularly useful in wire and cable applications, building products (e.g., PVC pipe and shingling), automotive and electrical products. Preferably, the copper complex and amine molybdate each are used in amount of from about 0.01 to 30% by weight of the resin.

EXAMPLE 1

Varied amounts of melamine octamolybdate are compounded into rigid PVC at 200° C. with Geon 30 PVC, 2 phr Microthene 510 lubricant, 2 phr tin thioglycolate stabilizer and varied amounts of organocopper complexes. The composition is compression molded and subjected to various tests with the results tabulated in Table 1.

TABLE 1

RIGID PVC COMPOUNDS

| Example | Loading (phr) Molybdenum compound | Loading (phr) Copper complex | Compound Thermal Stability (min) | Oxygen Index | % Smoke Reduction (Dmc in ASTM E-662) |
| --- | --- | --- | --- | --- | --- |
| Control | None | None | >120 | 45 | — |
| 1 | 0.5 | 0.5<sup>a</sup> | >120 | 46 | 77 |
| 2 | 1.0 | 0.5<sup>a</sup> | >120 | 47 | 85 |
| 3 | 2.0 | 0.5<sup>a</sup> | >120 | 49 | 96 |
| 4 | 2.0 | 1.0<sup>a</sup> | >120 | 49 | 96 |
| 4 | 2.0 | None | >120 | 49 | 87 |
| 5 | 0.5 | 0.5<sup>b</sup> | 60 | 45 | 77 |
| 6 | 1.0 | 0.5<sup>b</sup> | 60 | 45 | 85 |
| 7 | 2.0 | 0.5<sup>b</sup> | 60 | 46 | 90 |
| 8 | 2.0 | 1.0<sup>b</sup> | 45 | 46 | 90 |
| 9 | 2.0 | 0.5<sup>c</sup> | 60 | 47 | 84 |
| 10 | 2.0 | 1.0<sup>c</sup> | 40 | 48 | 90 |

Legend:
<sup>a</sup>Tris(tridecyl) phosphite complex
<sup>b</sup>Tris(isodecyl) phosphite complex
<sup>c</sup>Triphenyl phosphite copper complex

EXAMPLE 2

Flexible PVC(Geon 30) compositions are prepared by dry blending additives with Geon 30 PVC and then compounding in a two roll mill at 160° F. The compositions are compression molded and tested. The results are tabulated in Table 3. The general purpose formula used is set forth in Table 2:

TABLE 2

| MATERIAL | LOADING (phr) |
| --- | --- |
| Geon 30 PVC | 100 |
| Tris(2-Ethylhexyl)Trimellitate | 34 |
| Di(2-Ethylhexyl)Tetrabromophthalate | 40 |
| Melamine octamolybdate | Varies |
| Tris (tridecyl)phosphite copper complex | Varies |
| Antimony Trioxide | 2 |
| Lead Stabilizer (Dythal XL) | 7 |

TABLE 3

FLEXIBLE PVC COMPOSITIONS

| Example | Loading (phr) Molybdenum compound | Loading (phr) Copper Complex | Compound Thermal Stability (min) | Oxygen Index | % Smoke Reduction (Dmc in ASTM E-662) |
| --- | --- | --- | --- | --- | --- |
| Control | None | — | >120 | 34 | — |
| 1 | 0.5 | 0.5 | >120 | 36 | 35 |
| 2 | 1.5 | 0.5 | >120 |  | 40 |
| 3 | 2.5 | 0.5 | >120 |  | 45 |
| 4 | 0.5 | 1.0 | >120 |  | 50 |
| 5 | 1.5 | 1.0 | >120 | 38 | 59 |
| 6 | 2.5 | 1.0 | >120 | 39 | 80 |
| 7 | None | 1.0 | >120 | 35 | 65 |
| 8 | 2.5 | None | >120 | 38 | 20 |

EXAMPLE 3

Flexible PVC(Geon 30)-PVDF(Kynar Flex 3120–50) compositions are prepared by dry blending additives with Geon 30 PVC and then compounding in a two roll mill at 180° F. The compositions are compression molded and tested. The results are tabulated in Table 5. The general purpose formula used is set forth in Table 4:

TABLE 4

| MATERIAL | LOADING (phr) |
| --- | --- |
| Geon 30 PVC | 50 |
| Kynar Flex 3120 | 50 |
| Di(2-Ethylhexyl)Tetrabromophthalate | 30 |
| Melamine octamolybdate | Varies |
| Tris(Tridecyl phosphite) Copper Complex | Varies |
| Lead Stabilizer (Dythal XL) | 7 |

TABLE 5

FLEXIBLE PVC-PVDF-COMPOUNDS

| Example | Loading (phr) Molybdenum compound | Loading (phr) Copper Complex | Compound Thermal Stability (min) | Oxygen Index | % Smoke Reduction (Dmc in ASTM E-662) |
| --- | --- | --- | --- | --- | --- |
| 1 | None | 2.5 | >120 | 39 | 25 |
| 2 | 2.5 | None | >120 | 42 | 30 |
| 3 | 2.5 | 2.5 | >120 | 42 | 65 |

We claim:

1. A method of improving the smoke suppressant characteristics of halogen-containing polymeric compositions which comprises adding to said polymeric compositions a smoke retardant amount of (1) a complex of a cuprous halide and a phosphite, and (2) an amine molybdate which contains no residual molybdenum trioxide prepared by reacting an amine with molybdenum trioxide in an aqueous acidic medium under greater than atmospheric pressure, at a temperature of from 105–150° C. and for a reaction time that is sufficient to eliminate all detectable molybdenum trioxide.

2. The method of claim 1 wherein said halogen containing polymeric composition is selected from the group consisting of PVC, PVDF, PTFE, PVDC, CPVC, and ECTFE resins.

3. The method of claim 1 wherein said halogen containing polymeric composition is polyvinyl chloride.

4. The method of claim 1 wherein said amine is melamine.

5. The method of claim 1 wherein said cuprous halide is cuprous chloride and said phosphite is selected from the group consisting of tris-dodecyl phosphite, tris-tridecyl phosphite, tris-$C_{12-15}$ alkyl phosphite, tetraphenyl dipropylene glycol diphosphite, poly(dipropylene glycol)phenyl phosphite, alkyl($C_{12-15}$)bisphenol A phosphite, alkyl($C_{10}$) bisphenol A phosphite, distearyl pentaerythritol diphosphite, trisnonylphenyl phosphite, triisooctyl phosphite, diisodecyl pentaerythritol diphosphite, heptakis(dipropylene glycol) triphosphite, poly-4,4'-isopropylidenediphenol $C_{12-15}$ alcohol phosphite, tris-dipropyleneglycol phosphite, poly(dipropylene glycol)phenyl phosphite, diphenyl isooctyl phosphite, tris(2,4-t-butylphenyl)phosphite, bis(2,4-dicumylphenyl)pentaerythritol diphosphite, tris butoxyethyl phosphite, triphenyl phosphite, diphenyl isodecyl phosphite, phenyl diisodecyl phosphite and diphenyl phosphite.

6. A halogen-containing polymeric composition having improved smoke suppressant characteristics obtained by adding to said polymeric composition a smoke retardant amount of (1) a complex of a cuprous halide and a phosphite, and (2) an amine molybdate which contains no residual molybdenum trioxide prepared by reacting an amine with molybdenum trioxide in an aqueous acidic medium under greater than atmospheric pressure, at a temperature of from 105–150° C. and for a reaction time that is sufficient to eliminate all detectable molybdenum trioxide.

7. A halogen-containing polymeric composition as defined in claim 6 wherein said halogen containing polymeric composition is selected from the group consisting of PVC, PVDF, PTFE, PVDC, CPVC, and ECTFE resins.

8. A halogen-containing polymeric composition as defined in claim 6 wherein said halogen containing polymeric composition is polyvinyl chloride.

9. A halogen-containing polymeric composition as defined in claim 6 wherein said amine is melamine.

10. A halogen-containing polymeric composition as defined in claim 6 wherein said cuprous halide is cuprous chloride and said phosphite is selected from the group consisting of tris-dodecyl phosphite, tris-tridecyl phosphite, tris-$C_{12-15}$ alkyl phosphite, tetraphenyl dipropylene glycol diphosphite, poly(dipropylene glycol)phenyl phosphite, alkyl ($C_{12-15}$)bisphenol A phosphite, alkyl(C10)bisphenol A phosphite, distearyl pentaerythritol diphosphite, trisnonylphenyl phosphite, triisooctyl phosphite, diisodecyl pentaerythritol diphosphite, heptakis(dipropylene glycol) triphosphite, poly-4,4'-isopropylidenediphenol $C_{12-15}$ alcohol phosphite, tris-dipropyleneglycol phosphite, poly(dipropylene glycol)phenyl phosphite, diphenyl isooctyl phosphite, tris(2,4-t-butylphenyl)phosphite, bis(2,4-dicumylphenyl) pentaerythritol diphosphite, tris butoxyethyl phosphite, triphenyl phosphite, diphenyl isodecyl phosphite, phenyl diisodecyl phosphite and diphenyl phosphite.

* * * * *